Nov. 4, 1969   R. L. ADAMS   3,476,893
SAFETY ELECTRICAL CIRCUIT FOR AN AUTOMOBILE
Filed Aug. 23, 1968

INVENTOR
RICHARD L. ADAMS

BY *Jeffers and Young*
ATTORNEYS

United States Patent Office 3,476,893
Patented Nov. 4, 1969

3,476,893
**SAFETY ELECTRICAL CIRCUIT FOR
AN AUTOMOBILE**
Richard L. Adams, 3713 Nevada Ave.,
Fort Wayne, Ind. 46805
Continuation-in-part of application Ser. No. 614,154,
Feb. 6, 1967. This application Aug. 23, 1968, Ser.
No. 754,833
Int. Cl. H01h 35/00
U.S. Cl. 200—52                            1 Claim

ABSTRACT OF THE DISCLOSURE

The negative terminal of the storage battery for an automobile is connected through a circuit breaker to the ground system of the automobile. The battery is rendered operative or inoperative by a manual button on the circuit breaker, and is automatically rendered inoperative in response to a current flow that exceeds a selected magnitude.

Cross reference to related applications

This application is a continuation-in-part of my pending application filed Feb. 6, 1967, Ser. No. 614,154, now abandoned.

Background of the invention

My invention relates to a safety electrical circuit for an automobile, and particularly to such a circuit that can selectively connect and disconnect the negative ground connection for the storage battery by a manual button, and that automatically disconnects the ground connection for the storage battery in response to battery current that exceeds a selected magnitude.

In automobile accidents and mishap, one of the greatest dangers is fire which may be caused by electrical wiring and other devices being short-circuited. Such fires are particularly dangerous because gasoline almost always leaks or spills in such accidents or mishaps. It is therefore desirable that some means be provided in the automobile for being able to manually disconnect the negative ground from the storage battery, and that some means be provided to automatically disconnect the negative ground from the storage battery in response to a current flow that exceeds a selected magnitude.

Accordingly, an object of my invention is to provide a new and improved safety electrical circuit for an automobile.

Another object of my invention is to provide a new and improved safety electrical circuit for an automobile storage battery so that the battery can be manually rendered operative or inoperative, and so that the battery is automatically rendered inoperative in response to current flow that exceeds a selected magnitude.

Still another object of my invention is to provide an improved electrical circuit breaker circuit between the negative terminal of an automobile storage battery and the ground system of the automobile.

Summary of the invention

Briefly, these and other objects are achieved in accordance with my invention by an electrical circuit breaker having an internal electrical circuit that can be opened or closed in response to a manual button, and that is automatically opened in response to current flow through the circuit breaker internal circuit that exceeds a selected magnitude. The negative terminal of the automobile storage battery is connected to ground only through the internal circuit of the circuit breaker, so that the battery may be selectively connected and disconnected from ground, and so that the battery is automatically disconnected from ground in response to a current magnitude that exceeds a selected magnitude.

Brief description of the drawing

The subject matter which I regard as my invention is particularly pointed out and distinctly claimed in the claim. The structure and operation of my invention, together with further objects and advantages, may be better understood from the following description given in connection with the accompanying drawing, in which:

Description of the preferred embodiment

Figure 1:
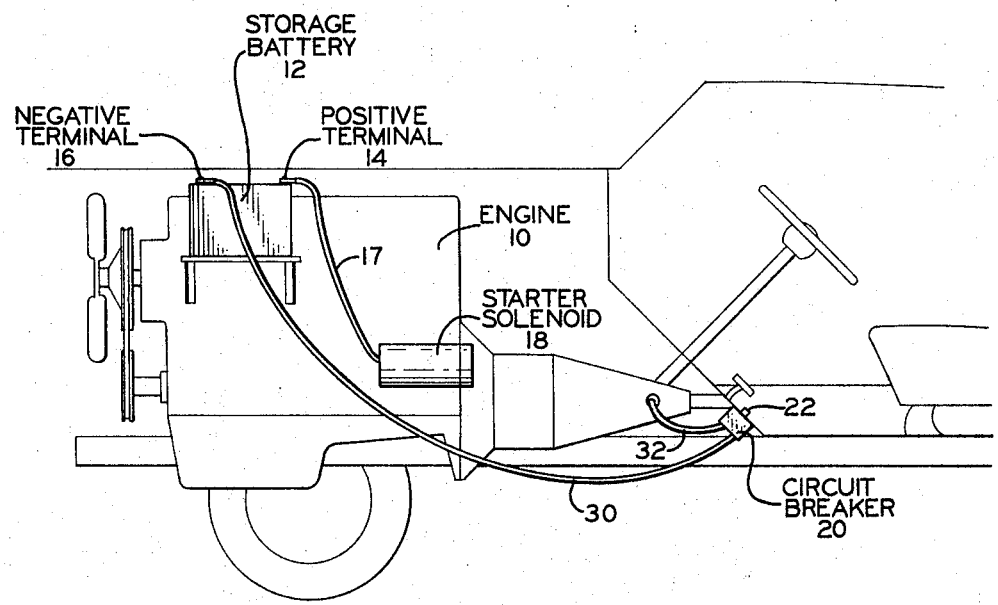
FIGURE 1 shows a partial view of an automobile that is provided with the improved safety electrical circuit in accordance with my invention.

With reference to FIGURE 1, I have shown a side view of a portion of a typical automobile. In FIGURE 1, I show the automobile engine 10 with a typical electrical storage battery 12 positioned nearby. The storage battery 12 has the usual positive terminal 14 and negative terminal 16 for connection to the various electrical circuits in the automobile. The positive terminal 14 is connected by a cable 17 of sufficient gauge and insulation to the starter solenoid 18 and to the other electrical devices and circuits in the automobile. In previous automobiles, the negative terminal 16 was connected to the ground system (such as at the engine block) of the automobile to provide the return path for the electrical devices and circuits. However, in accordance with my invention, the negative terminal 16 is connected to the ground system of the automobile through a circuit breaker 20. The circuit breaker 20 is mounted at a convenient location in the automobile (such as on the floor near the controls), so that preferably the operator can manually operate the circuit breaker 20. The circuit breaker 20 includes a manual button 22 which opens and closes an internal circuit through the breaker 20. As is known in the art, the breaker 20 includes magnetic or heat responsive means which also cause the internal electrical circuit to open in response to a current flow that exceeds a selected magnitude. One side of the internal circuit of the circuit breaker 20 is connected to the negative terminal 16 of the storage battery 12 by a cable 30 of sufficient gauge and insulation. The other side of the internal circuit of the circuit breaker 20 is connected to the ground system of the automobile, such as the engine block, by a cable 32 of sufficient gauge and insulation.

Figure 2:
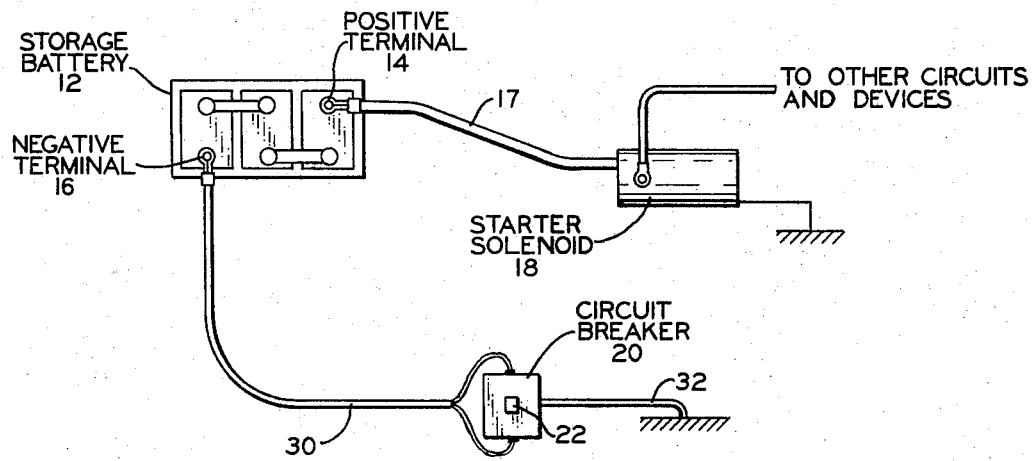
FIGURE 2 shows an electrical diagram of my safety electrical circuit.

FIGURE 2 shows an electrical diagram of the safety electrical circuit in accordance with my invention. In FIGURE 2, it will be seen how the positive terminal 14 of the storage battery 12 is connected by the cable 17 to the starter solenoid 18 and other circuits and devices in the automobile, and how the negative terminal 16 of the battery 12 is connected by the cable 30 to the circuit breaker 20. In some cases, the circuit breaker 20 may have two terminals on one side of its internal circuit, so that the cable 30 may be split into two parallel paths connected to the terminals on the one side of the internal electrical circuit of the breaker 20. The other terminal of the internal circuit of the breaker 20 is connected through the cable 32 to the ground system of the automobile. The button 22 is also indicated in FIGURE 2.

In operation, the negative terminal 16 of the automobile battery 12 can only be grounded to the ground system of the automobile through the circuit breaker 20. In order that the various electrical devices and circuits can work in the automobile, the internal circuit in the breaker 20 must be manually closed by operating the button 22. When this internal circuit is closed, the negative terminal 16 of the battery 12 is grounded, and the various devices and circuits in the automobile can be operated. It will be appreciated that the circuit breaker 20 must have an automatic current rating or setting so that its internal circuit can carry the starting current for the starter solenoid 18 and the starter motor. However, the rating or setting of the breaker 20 is selected so that a current magnitude in excess of the starting current causes the internal circuit in the circuit breaker 20 to open and remove the ground from the negative terminal 16 of the battery 12. Thus, the hazards and dangers of fires from electrical short circuits are prevented. In addition, the circuit breaker 20 may be concealed at a suitable place so that the operator can manually open and close the internal circuit of the circuit breaker 20 by operating the button 22. Thus, persons without authority cannot operate the automobile.

It will thus be seen that my invention provides a new and improved safety electrical circuit for an automobile. Persons skilled in the art will appreciate that various types of circuit breakers can be used, the main requirements being that the breaker be able to carry the starting current for the automobile starter motor, but that the breaker automatically open its internal circuit when this current magnitude is exceeded. Therefore, while my invention has been described with reference to a particular embodiment, it is to be understood that modifications may be made without departing from the spirit of the invention or from the scope of the claim.

What I claim as new and desire to secure by Letters Patent of the United States is:

1. A safety electrical circuit in an automobile having a storage battery for operation with a negative ground system in said automobile, said electrical circuit comprising:
   (a) an electrical circuit breaker having a pair of connection terminals connected in said circuit, a manually operable button connected in an internal electrical circuit between said pair of terminals that can be selectively closed and opened in response to manual operation of said button that is automatically opened in response to a current flow through said internal electrical circuit that exceeds a selected magnitude greater than the starting current for said automobile;
   (b) said electrical circuit breaker being mounted on said automobile so that said manually operable button can be operated by the operator of said automobile;
   (c) means connecting one of said terminals of said electrical circuit breaker to the negative terminal of said storage battery in said automobile;
   (d) and means connecting the other of said terminals of said electrical circuit breaker to the ground system of said automobile whereby said negative terminal of said storage battery can be grounded only through said internal circuit of said circuit breaker, and whereby said electrical circuit breaker is effective to disconnect the ground circuit of said battery in response to a current flow in excess of said selected magnitude as well as in response to manual operation of said button.

References Cited
UNITED STATES PATENTS

| | | | |
|---|---|---|---|
| 2,262,205 | 11/1941 | Schactner | 337—74 X |
| 2,663,773 | 12/1953 | Drobney | 337—74 X |
| 2,701,829 | 2/1955 | Krieger | 337—74 X |

BERNARD A. GILHEANY, Primary Examiner

H. B. GILSON, Assistant Examiner

U.S. Cl. X.R.

337—1